United States Patent
Ringuette et al.

(10) Patent No.: US 11,887,551 B1
(45) Date of Patent: Jan. 30, 2024

(54) ELECTRONIC INK BASED CAMERA PRIVACY SHUTTER

(71) Applicant: LENOVO (SINGAPORE) PTE. LTD, Singapore (SG)

(72) Inventors: Justin Michael Ringuette, Morrisville, NC (US); Mark Summerville, Apex, NC (US); Sandy Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/930,266

(22) Filed: Sep. 7, 2022

(51) Int. Cl.
*G09G 3/34* (2006.01)
*G03B 9/58* (2021.01)
*G02F 1/167* (2019.01)

(52) U.S. Cl.
CPC ............... *G09G 3/344* (2013.01); *G03B 9/58* (2013.01); *G02F 1/167* (2013.01)

(58) Field of Classification Search
CPC .......... G03B 9/08; G03B 9/58; G03B 11/041; G03B 11/043; G03B 11/045; G02F 1/167; G02F 1/172; G09G 3/344
See application file for complete search history.

(56) References Cited

FOREIGN PATENT DOCUMENTS

| JP | 2004061840 A | * | 2/2004 | |
|---|---|---|---|---|
| WO | WO-9938335 A1 | * | 7/1999 | ......... G02B 27/2285 |
| WO | WO-2019201428 A1 | * | 10/2019 | ............ G02F 1/167 |

* cited by examiner

*Primary Examiner* — Christopher E Mahoney
(74) *Attorney, Agent, or Firm* — Schwegman Lundberg & Woessner, P.A.

(57) ABSTRACT

A shutter system includes an electronic device having a camera with a lens. A shutter is supported by the electronic device to block light transmission through the lens in a first state and permit light transmission in a second state. The shutter includes a shutter body containing electrically charged light blocking particles in suspension, a first pair of electrodes positioned to move the electrically charged light blocking particles to achieve the first state in response to a first voltage being applied to the first pair of electrodes, and a second pair of electrodes positioned to move the electrically charged light blocking particles to achieve the second state in response to a second voltage being applied to the second pair of electrodes.

18 Claims, 4 Drawing Sheets

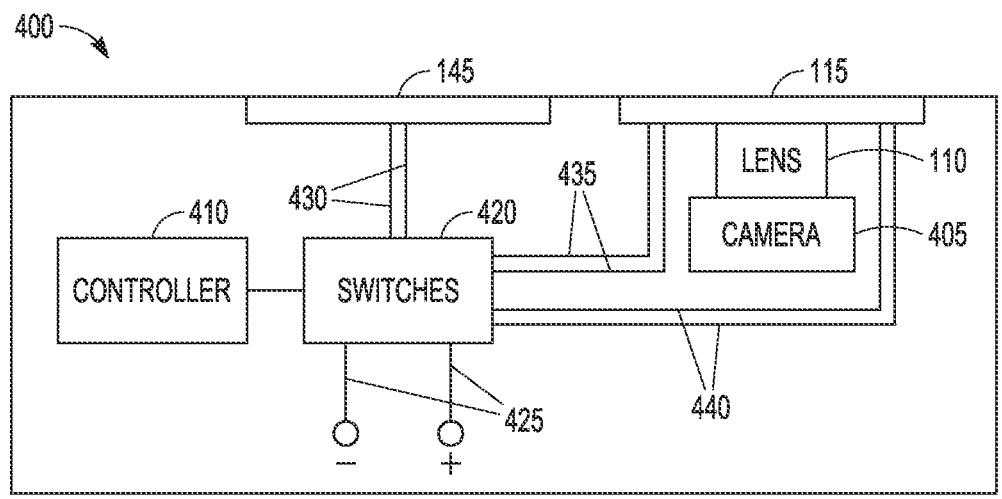
FIG. 4
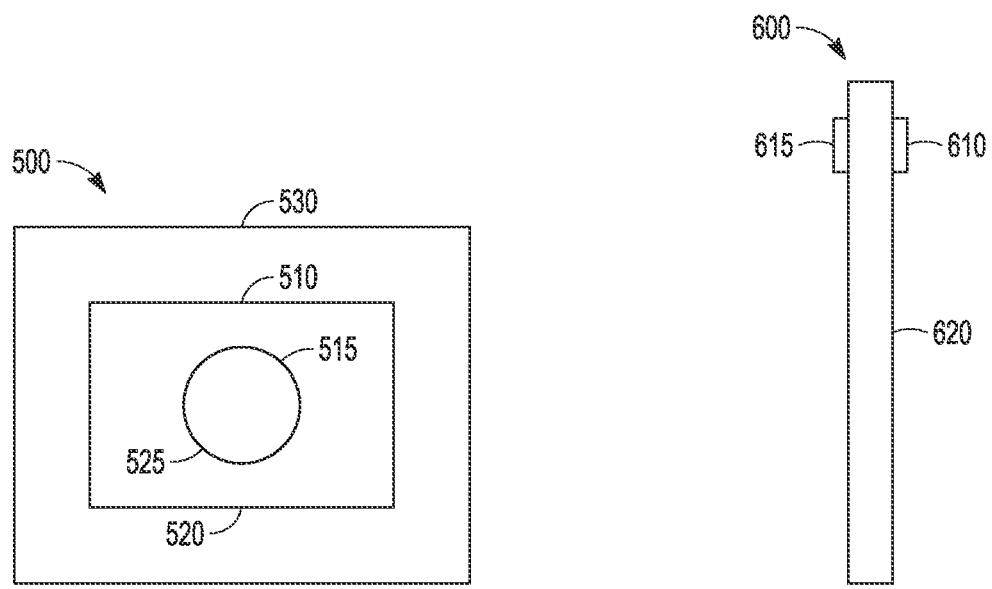
FIG. 5
FIG. 6

ELECTRONIC INK BASED CAMERA PRIVACY SHUTTER

BACKGROUND

Electronic devices with cameras and wireless or wired communication capabilities are capable of transmitting views of a user without the user intending to transmit such views. To minimize the chances of such unintended transitions, user have resorted to placing objects over camera lenses to prevent the capture and hence transmission of images. Some of the objects used include opaque mechanical structures, such as sliding shutters which add thickness and can increase pressure on the camera lens when a device lid is closed. The user must physically slide the shutter and remember to close the shutter following intended use of the camera. Other users place a sticker or tape over the camera lens. While highly secure, the sticker or tape can be impractical to remove for temporary camera use as well as being esthetically unpleasant. An electronically controlled shutter utilizing a polymer dispersed liquid crystal layer may also be used but requires application of a voltage to maintain a desired operative state. Using such layers may not provide feedback that the lens is blocked or not, leading to a sense of perceived low security.

SUMMARY

A shutter system includes an electronic device having a camera with a lens. A shutter is supported by the electronic device to block light transmission through the lens in a first state and permit light transmission in a second state. The shutter includes a shutter body containing electrically charged light blocking particles in suspension, a first pair of electrodes positioned to move the electrically charged light blocking particles to achieve the first state in response to a first voltage being applied to the first pair of electrodes, and a second pair of electrodes positioned to move the electrically charged light blocking particles to achieve the second state in response to a second voltage being applied to the second pair of electrodes.

BRIEF DESCRIPTION OF THE DRAWINGS

FIG. 4 is a schematic diagram of a shutter control system according to an example embodiment.

FIG. 5 is a top view block representation of a shutter system that includes a shutter positioned to block or permit light to pass through a lens according to an example embodiment.

FIG. 6 is a side view block representation of an electronic device having a shutter on a first side of the electronic device and an indicator on a second side of the electronic device according to an example embodiment.

DETAILED DESCRIPTION

Figure 1:
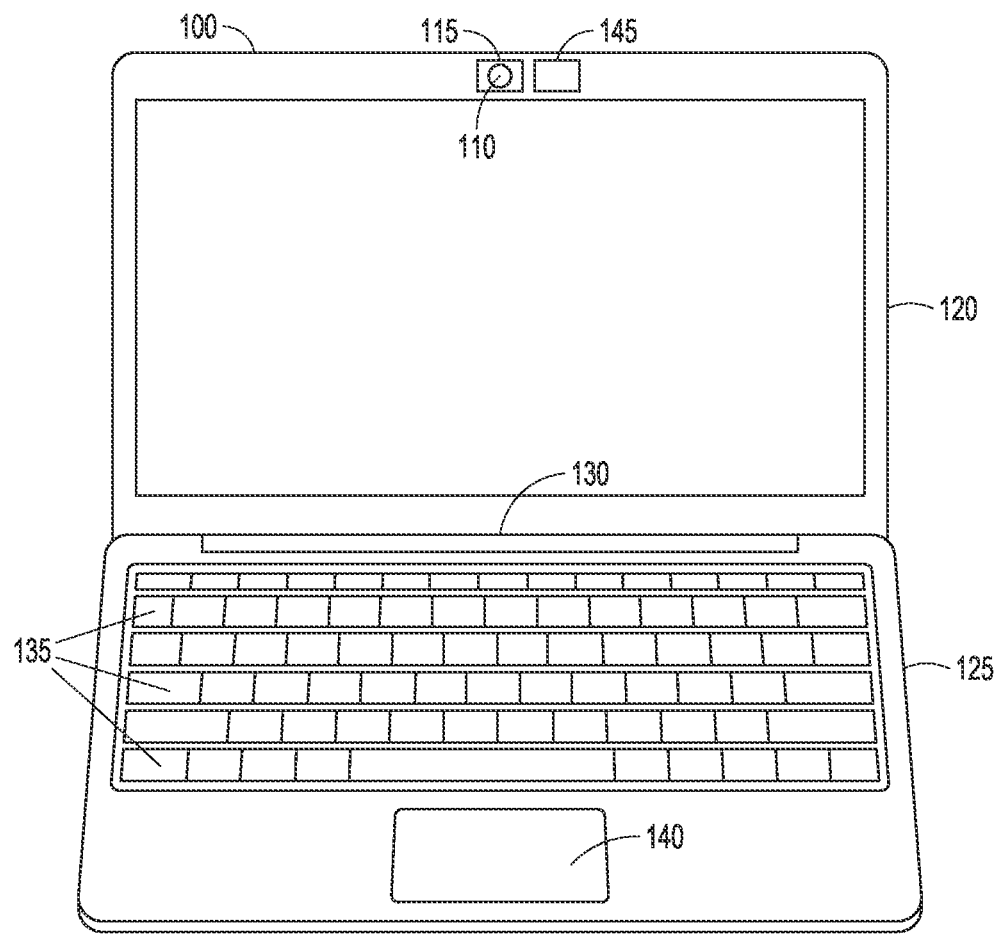
FIG. 1 is a block diagram of an electronic device having a camera with a lens and a shutter coupled to cover the camera lens according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is a block diagram of shutter system for an electronic device 100 having a camera with a lens 110 and a shutter 115 coupled to cover the camera lens 110. The shutter 115 is supported by the electronic device 100 to block light transmission through the lens in a first state, referred to as a blocking state. The shutter 115 permits light transmission in a second state, referred to as a transmissive state. The electronic device 100 may be a laptop computer having a display 120 coupled to a keyboard section 125 that are hinged together at 130. The keyboard section 125 may also include keys 135 and a touchpad 140. In further examples device 100 may be a smart phone, touchpad, or other electronic device that includes a camera. An indicator 145 may also be supported by the device 100 near, adjacent, or otherwise associated with the camera to provide an indication to a user whether or not light is blocked from reaching the camera or light is reaching the camera for capturing images. Indicator 145 may be any type of device that provides visible indication to a user. Examples include a light emitting diode, polymer dispersed liquid crystal PDLC layer, electronic ink display, or other visible device that can be controlled coincident with control of the shutter 115 to show the state of the shutter 115.

In one example, the shutter 115 utilizes electrically charged light blocking particles in a fluid suspension material wherein the electrically charged particles migrate or move in response to an electrical field created by a voltage applied across the suspension. Electronic ink may be used in one embodiment, with the particles dyed to be opaque or otherwise non-transmissive to light.

The shutter 115 may be supported over the lens 110 or embedded as a layer in the lens 110 in various examples. In further examples, the shutter 115 may be supported between the lens 110 and an image capturing portion of the camera. Means for supporting the shutter about the camera lens of an electronic device provide the ability to selectively block and permit light transmission through the camera lens.

Figure 2A:
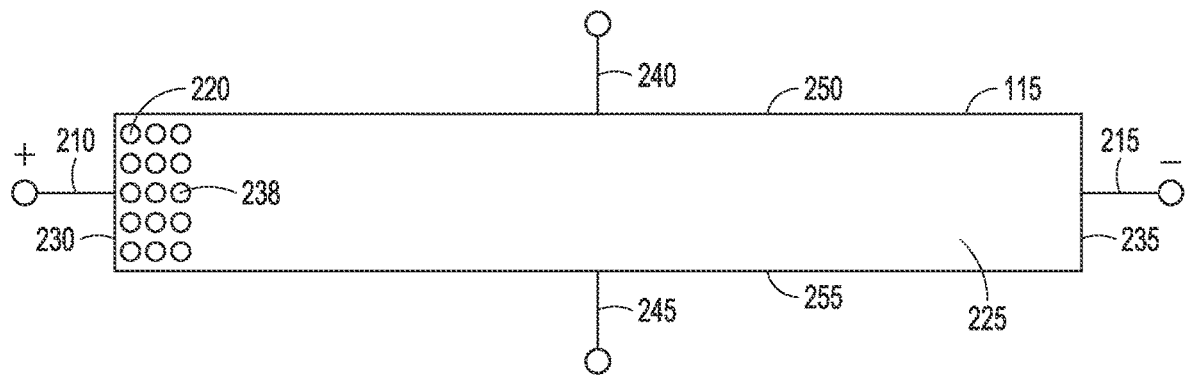
FIGS. 2A and 2B are block cross section view representations of a shutter having pairs of electrodes for migrating electrically charged particles to light blocking and light transmissive steady states according to an example embodiment.

FIG. 2A is a block cross section view representation of shutter 115 having a first pair of electrodes 210, 215 positioned on opposite lateral sides of the shutter 115 to move electrically charged light blocking particles 220 laterally through a suspension 225 to achieve the transmissive state in response to a first voltage being applied to the first pair of electrodes 210 and 215. In one example, the particles 220 are negatively charged and are shown moved toward electrode 210 which is provided with a positive voltage compared to electrode 215 which has a negative voltage, or a voltage that is at least lower than the voltage on electrode 210. The applied voltage generates an electric field across the suspension. Electrodes 210 and 215 may include conductive plates 230, 235 disposed on and covering all or substantially all of opposite lateral sides of the shutter to ensure a fairly uniform electric field through the suspension.

Once the particles have migrated to a side near electrode 210 as indicated at layer 238, the voltage may be discontinued with the particles remaining where they migrated. The length of time the electric charge is provided may be varied depending on the length of migration needed for sufficient particle migration to allow transmission of light through the lens. The electrically charged light blocking particles remain in the first or second state in the absence of a voltage being applied to first or second pairs of electrodes.

Electrodes 240 and 245 are shown coupled to opposite vertical sides or surfaces of the shutter 115. The electrodes 240 and 245 may include conductors coupled to transparent or substantially transparent plates 250 and 255 that cover or substantially cover surfaces of the shutter that are oriented in the same direction as the orientation of surfaces of the lens 110 that receive and transmit light axially along the lens to a camera or charge coupled display (CCD) of the camera for generating digital data representative of images in a field of view of the lens and CCD combination. The conductors may be thin enough not to interfere with light transmission in one example.

Figure 2B:
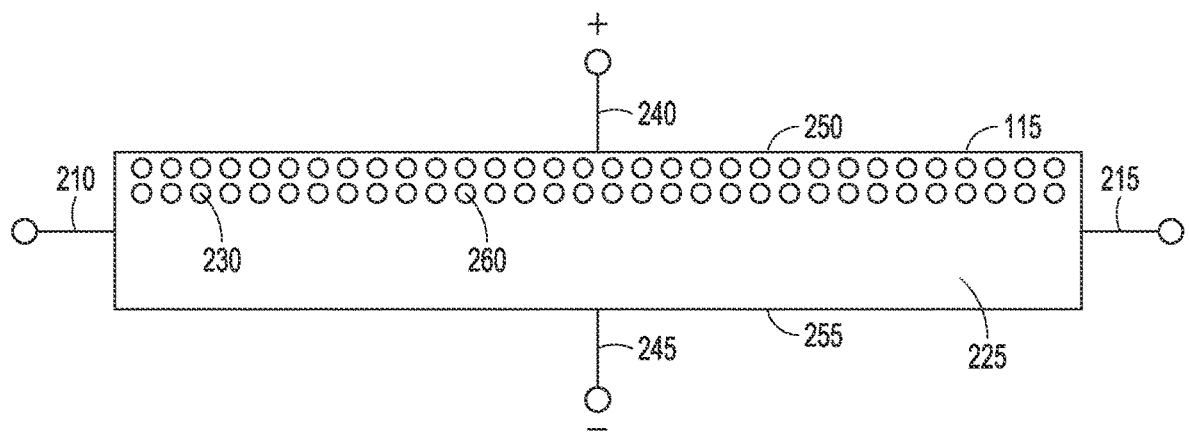

FIG. 2B is a block cross section view representation of shutter 115 having a positive voltage applied across electrodes 240 and 245. Electrodes 240 and 245 are positioned to move the electrically charged light blocking particles 220 to achieve the first or blocking state in response to a second voltage being applied to the second pair of electrodes. The particles 230 are attracted to electrode 240 and form a transverse layer 260 that blocks light. In one example, the shutter 115 has a length and width greater than the lens such that light is blocked from passing through the lens when the particles are in the second state. Layer 260 may be formed at either electrode and still provide a light blocking layer.

Shutter 115 may be formed such that it has a perimeter that fully encompasses a field of view of the lens and camera in one example to ensure that the layer 260 blocks sufficient light to provide a desired level of privacy for a user. The shutter 115 may extend further on one lateral side where layer 238 is formed such that there is sufficient room for the formation of layer 238 not to obstruct the field of view. In further embodiments, the plates 250 and 255 may be sized to ensure that portions of the layer 260 are thick enough where the field of view intersects the lens to provide a desired level of light blocking.

Figure 3:
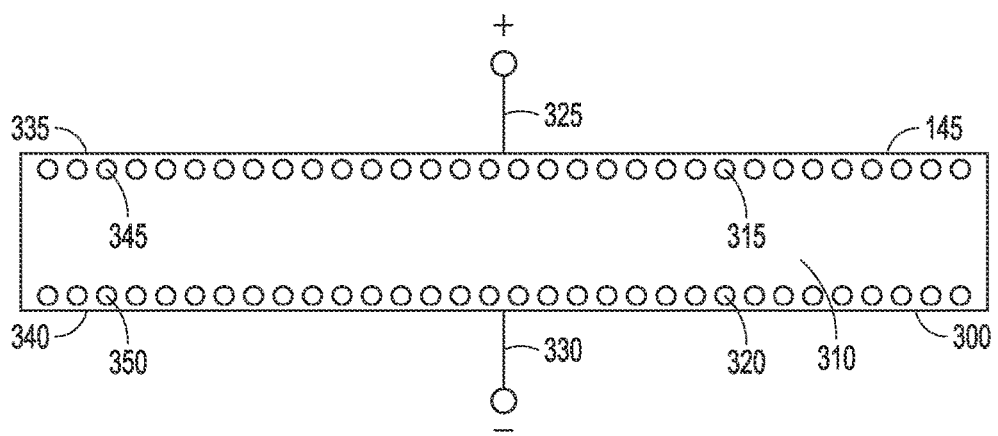
FIG. 3 is a block cross section view of an example indicator utilizing electronic ink according to an example embodiment.

FIG. 3 is a block cross section view of an example indicator 145 utilizing electronic ink. In this example, indicator 145 includes a body 300 containing a suspension 310 and two different color sets of oppositely charged dyed particles 315 and 320. A first color is used to indicate that the shutter is blocking light, and a second color is used to indicate that the shutter is allowing light to pass. An electric field applied via first and second electrodes 325 and 330, which includes transparent conductive plates 335 and 340 cause particles 315 to migrate toward a positive charge to form a layer 345 and particles 320 to migrate in an opposite direction toward a negative charge to form a layer 350. The layer closest to the user reflects the color of the particles in that layer. As shown, the first color is visible to the user. Reversing the polarity of the charges results in the particles migrating oppositely that shown such that the second color is visible the user. In one example, the same voltage applied to the shutter 115 may be used to migrate the particles in the indicator 145. As with the shutter 115, the voltage may be discontinued once the particles have migrated, eliminating the need for a continuous voltage to be applied to maintain the shutter and indicators in desired states, saving on energy utilization.

FIG. 4 is a schematic diagram of a shutter control system 400 according to an example embodiment. Shutter control system 400 includes a camera 405 optically coupled to the lens 110 and shutter 115. A controller 410 is coupled to control the shutter 115 and indicator 145. Such control may be done by controlling a set of switches 420 to provide voltages to the shutter and indicator 145 to control the color of the indicator 145 and the opacity of the shutter 115. The switches 420 simply switch a reference voltage 425 via conductors 430 to indicator 145 and conductors 435 to shutter 115.

In one example, the same voltage may be used for both the shutter 115 and indicator 145 such that the indicator is the desired color in response to the shutter being in either one of the states. Different voltages may be used in further examples to ensure full migration of particles 220 to minimize blocking of light through the lens 115 in the transmissive state. The length of time the voltages are applied may also be varied.

In a further example, the indicator may be positioned around the shutter and controlled via conductors 440.

FIG. 5 is a top view block representation of a shutter system 500 that includes a shutter 510 positioned to block or permit light to pass through a lens 515. The shutter 510 may be constructed and controlled in the same manner as shutter 115, having a perimeter 520 that may be rectangular in shape and encompasses a perimeter 525 of lens 515. The lens 515 may be centered in the shutter 510 in one example, or offset to one side, allowing more space for the particles to migrate away from the lens 515 and outside of the perimeter 525 of the lens 515 in the transmissive state.

Shutter system 500 includes an indicator 530 in the form of a rectangular ring around the perimeter 520 of the shutter 510, surrounding the shutter 510. The indicator 530 may be formed in the same manner as indictor 145 and controlled to change color in response to a change in state of the shutter 510. The indicator 530 provides a user visible indication to a user of an electronic device incorporating shutter system 500 representing whether or not light can reach a camera associated with the lens 515.

While rectangular shapes of shutters and indicators are shown, other shapes, such as triangles, or other polygons or ovals or circles may be used in further examples, with conductive plates of similar shapes to cause desired particle migration patterns.

FIG. 6 is a side view block representation of an electronic device 600 having a shutter 610 on a first side of the electronic device 600 and an indicator 615 on a second side of the electronic device 600. As shown the indicator 615 and shutter 610 are positioned directly opposite each other. This configuration works well for a laptop device, phone, pad, or other device which may have a user interface, such as a touch screen 620 on the indicator 615 second side, and a camera on the first side that normally faces away from a user interacting with the electronic device. Touch screen 620 may also utilize electronic ink to reduce power requirements for display of information. The use of electronic ink for the shutter 610 and indicator 615 also helps reduce power consumption over previous powered elements for blocking light or providing indications of camera status.

Figure 7:
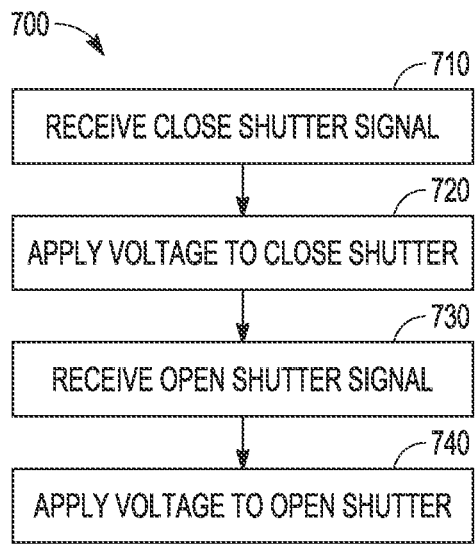
FIG. 7 is flowchart illustrating a method of controlling a shutter according to an example embodiment.

FIG. 7 is flowchart illustrating a method 700 of controlling a shutter according to an example embodiment. Method 700 includes an operation 710 that receives a close shutter signal. In response to the close shutter signal, a voltage is applied at operation 720 across a first transparent conductive layer and a second transparent conductive layer forming a stack of layers covering a camera lens of a device. In response to an electric field created, electrically charged light blocking particles in a suspension fluid in a third layer between the first and second transparent conductive layers are moved vertically to block light transmission in a first state.

The voltage may be applied long enough for the particles to migrate and form a blocking layer of particles that blocks light from being transmitted through the lens to a camera, effectively closing the shutter. Thereafter, the voltage may be discontinued, and the particles remain in the migrated light blocking position in the absence of the voltage.

At operation 730, an open shutter signal may be received. In response to the open shutter signal, operation 740 causes application of a second voltage to a pair of electrodes coupled to cause the electrically charged light blocking particles to move laterally within the suspension fluid to permit light transmission in a second state.

The voltage may be applied long enough for the particles to migrate laterally far enough to allow light through the lens to the camera, effectively opening the shutter. Thereafter, the voltage may be discontinued, and the particles remain in the migrated light transmissive position in the absence of the voltage.

The operations of FIG. 7 may be performed in either order, migrating the particles to desired positions to allow light transmission or light blocking states as desired by a user.

Figure 8:
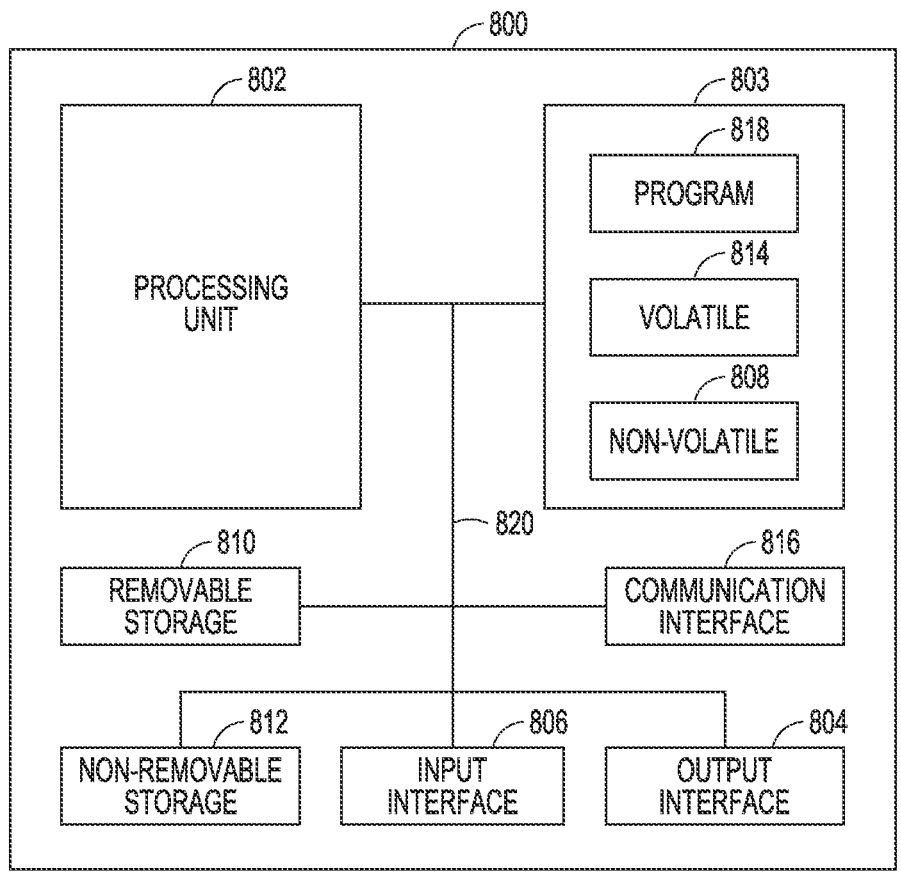
FIG. 8 is a block schematic diagram of a computer system to implement one or more example embodiments.

FIG. 8 is a block schematic diagram of a computer system 800 to implement one or more controllers and devices, as well as for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, microphone, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves to the extent carrier waves are deemed too transitory. Storage can also include networked storage, such as a storage area network (SAN). Computer program 818 along with the workspace manager 822 may be used to cause processing unit 802 to perform one or more methods or algorithms described herein.

EXAMPLES

A shutter system includes an electronic device having a camera with a lens. A shutter is supported by the electronic device to block light transmission through the lens in a first state and permit light transmission in a second state. The shutter includes a shutter body containing electrically charged light blocking particles in suspension, a first pair of electrodes positioned to move the electrically charged light blocking particles to achieve the first state in response to a first voltage being applied to the first pair of electrodes, and a second pair of electrodes positioned to move the electrically charged light blocking particles to achieve the second state in response to a second voltage being applied to the second pair of electrodes.

2. The shutter system of example 1 wherein the electrically charged light blocking particles remain in the first or second state in the absence of a voltage being applied to first or second pairs of electrodes.

3. The shutter system of any of examples 1-2 wherein the shutter body includes a suspension fluid and where the electrically charged light blocking particles comprise electronic ink dyed particles.

4. The shutter system of any of examples 1-3 and further including an indicator body supported by the electronic device, the indicator body comprising a third pair of electrodes responsive to a third voltage to cause the indicator body to reflect a first color in response to the shutter being in the first state and a second color in response to the shutter being in the second state.

5. The shutter system of example 4 wherein the indicator body contains electrically charged electronic ink particles of the first and second colors that and oppositely charged and move in opposite directions in response to an applied electric field.

6. The shutter system of any of examples 4-5 wherein the indicator body is supported on an opposite side of the electronic device from the lens of the camera and the shutter body.

7. The shutter system of any of examples 4-5 wherein the indicator body is supported adjacent the shutter body.

8. The shutter system of any of examples 4-5 wherein the indicator body includes a ring surrounding the shutter body.

9. The shutter system of any of examples 4-8 and further including a controller coupled to the first, second, and third pairs of electrodes to provide the first, second, and third voltages to the respective pairs of first, second, and third electrodes.

10. The shutter system of any of examples 1-9 wherein the shutter is supported over the camera lens.

11. The shutter system of any of examples 1-9 wherein the shutter is embedded in the camera lens.

12. The shutter system of any of examples 1-11 wherein the first pair of electrodes include conductive plates disposed on opposite lateral sides of the shutter body.

13. The shutter system of any of examples 1-12 wherein the second pair of electrodes include transparent conductive plates disposed on opposite vertical sides of the shutter body such that light is transmissible through the shutter body and axially through the lens in the first state and light is blocked through the shutter body in the second state.

14. A device includes a shutter body containing electrically charged light blocking particles in a suspension fluid to block light transmission in a first state and permit light transmission in a second state, a first pair of electrodes positioned to move the electrically charged light blocking particles laterally to achieve the first state in response to a first voltage being applied to the first pair of electrodes, a second pair of electrodes positioned to move the electrically charged light blocking particles vertically within the shutter body to achieve the second state in response to a second voltage being applied to the second pair of electrodes, and means for supporting the shutter body about a camera lens of an electronic device to selectively block and permit light transmission through the camera lens.

15. The device of example 14 and further including an indicator body supported by the electronic device, the indicator body comprising a third pair of electrodes responsive to a third voltage to cause the indicator body to reflect a first color in response to the shutter body being in the first state and a second color in response to the shutter body being in the second state.

16. The device of example 15 wherein the indicator body contains electrically charged electronic ink particles of the first and second colors that and oppositely charged and move in opposite directions in response to an applied electric field.

17. The device of any of examples 15-16 wherein the indicator body is supported on an opposite side of the electronic device from the lens of the camera and the shutter body.

18. The device of any of examples 15-16 wherein the indicator body is supported adjacent the shutter body.

19. The device of any of examples 15-16 wherein the indicator body includes a ring surrounding the shutter body.

20. A method includes in response to receiving a close shutter signal, applying a first voltage across a first transparent conductive layer and a second transparent conductive layer forming a stack of layers covering a camera lens of a device, such that electrically charged light blocking particles in a suspension fluid in a third layer between the first and second transparent conductive layers are moved vertically to block light transmission in a first state, and in response to receiving an open shutter signal, applying a second voltage to a pair of electrodes coupled to cause the electrically charged light blocking particles to move laterally within the suspension fluid to permit light transmission in a second state.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A shutter system comprising:
   an electronic device having a camera with a lens;
   a shutter supported by the electronic device to block light transmission through the lens in a first state and permit light transmission in a second state, the shutter comprising:
      a shutter body containing electrically charged light blocking particles in suspension;
      a first pair of electrodes positioned to move the electrically charged light blocking particles to achieve the first state in response to a first voltage being applied to the first pair of electrodes; and
      a second pair of electrodes positioned to move the electrically charged light blocking particles to achieve the second state in response to a second voltage being applied to the second pair of electrodes; and
   an indicator body supported by the electronic device, the indicator body comprising a third pair of electrodes responsive to a third voltage to cause the indicator body to reflect a first color in response to the shutter being in the first state and a second color in response to the shutter being in the second state.

2. The shutter system of claim 1 wherein the electrically charged light blocking particles remain in the first or second state in the absence of a voltage being applied to first or second pairs of electrodes.

3. The shutter system of claim 1 wherein the shutter body comprises a suspension fluid and where the electrically charged light blocking particles comprise electronic ink dyed particles.

4. The shutter system of claim 1 wherein the indicator body contains electrically charged electronic ink particles of the first and second colors that and oppositely charged and move in opposite directions in response to an applied electric field.

5. The shutter system of claim 1 wherein the indicator body is supported on an opposite side of the electronic device from the lens of the camera and the shutter body.

6. The shutter system of claim 1 wherein the indicator body is supported adjacent the shutter body.

7. The shutter system of claim 1 wherein the indicator body comprises a ring surrounding the shutter body.

8. The shutter system of claim 1 and further comprising a controller coupled to the first, second, and third pairs of electrodes to provide the first, second, and third voltages to the respective pairs of first, second, and third electrodes.

9. The shutter system of claim 1 wherein the shutter is supported over the camera lens.

10. The shutter system of claim 1 wherein the shutter is embedded in the camera lens.

11. The shutter system of claim 1 wherein the first pair of electrodes comprise conductive plates disposed on opposite lateral sides of the shutter body.

12. The shutter system of claim 1 wherein the second pair of electrodes comprise transparent conductive plates disposed on opposite vertical sides of the shutter body such that light is transmissible through the shutter body and axially through the lens in the first state and light is blocked through the shutter body in the second state.

13. A device comprising:
   a shutter body containing electrically charged light blocking particles in a suspension fluid to block light transmission in a first state and permit light transmission in a second state;
   a first pair of electrodes positioned to move the electrically charged light blocking particles laterally to achieve the first state in response to a first voltage being applied to the first pair of electrodes;
   a second pair of electrodes positioned to move the electrically charged light blocking particles vertically within the shutter body to achieve the second state in response to a second voltage being applied to the second pair of electrodes; and
   means for supporting the shutter body about a camera lens of an electronic device to
   selectively block and permit light transmission through the camera lens; and
   an indicator body supported by the device, the shutter body comprising a third pair of electrodes responsive to a third voltage to cause the shutter body to reflect a first color in response to the shutter body being in the first state and a second color in response to the shutter body being in the second state.

14. The device of claim 13 wherein the indicator body contains electrically charged electronic ink particles of the first and second colors that and oppositely charged and move in opposite directions in response to an applied electric field.

15. The device of claim 13 wherein the indicator body is supported on an opposite side of the electronic device from the lens of the camera and the shutter body.

16. The device of claim 13 wherein the indicator body is supported adjacent the shutter body.

17. The device of claim 13 wherein the indicator body comprises a ring surrounding the shutter body.

18. A shutter system comprising:
   an electronic device having a camera with a lens;
   a shutter supported by the electronic device to block light transmission through the lens in a first state and permit light transmission in a second state, the shutter comprising:
      a shutter body containing electrically charged light blocking particles in suspension;
      a first pair of electrodes positioned to move the electrically charged light blocking particles to achieve the first state in response to a first voltage being applied to the first pair of electrodes, wherein the first pair of electrodes comprise conductive plates disposed on opposite lateral sides of the shutter body;
      a second pair of electrodes positioned to move the electrically charged light blocking particles to achieve the second state in response to a second voltage being applied to the second pair of electrodes.

* * * * *